(12) United States Patent
Kurihara (10) Patent No.: US 11,609,734 B2
(45) Date of Patent: Mar. 21, 2023

(54) COMMUNICATION APPARATUS, METHOD OF CONTROLLING COMMUNICATION APPARATUS, AND STORAGE MEDIUM FOR WIRELESS COMMUNICATION

(71) Applicant: CANON KABUSHIKI KAISHA, Tokyo (JP)

(72) Inventor: Shukei Kurihara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 161 days.

(21) Appl. No.: 16/655,109

(22) Filed: Oct. 16, 2019

(65) Prior Publication Data
US 2020/0133605 A1    Apr. 30, 2020

(30) Foreign Application Priority Data

Oct. 25, 2018   (JP) .............................. JP2018-201271
Sep. 13, 2019   (JP) .............................. JP2019-166874

(51) Int. Cl.
*G06F 3/12*     (2006.01)
*G06K 7/14*     (2006.01)

(52) U.S. Cl.
CPC .......... *G06F 3/1292* (2013.01); *G06F 3/1286* (2013.01); *G06K 7/1417* (2013.01)

(58) Field of Classification Search
CPC .... G06F 3/1231; G06F 3/1236; G06F 3/1286; G06F 3/1292; G06F 3/1293; H04N 1/00106; H04N 1/00307; H04N 1/00315; H04N 2201/0034; H04N 2201/0048; H04N 2201/006

USPC ........................................................ 358/1.15
See application file for complete search history.

(56) References Cited

U.S. PATENT DOCUMENTS

| | | | |
|---|---|---|---|
| 2011/0292445 A1* | 12/2011 | Kato ................... | H04N 1/00222 358/1.15 |
| 2014/0063537 A1* | 3/2014 | Nishikawa ......... | H04N 1/00238 358/1.15 |
| 2016/0062717 A1 | 3/2016 | Kawasaki | |
| 2016/0100394 A1 | 4/2016 | Tachiwa | |
| 2016/0128119 A1 | 5/2016 | Maheshwari | |
| 2017/0064135 A1* | 3/2017 | Yoshimura ......... | H04N 1/32797 |
| 2017/0086237 A1* | 3/2017 | Ando ..................... | H04W 8/18 |
| 2018/0049257 A1 | 2/2018 | Liu | |
| 2019/0020766 A1* | 1/2019 | Omori .................... | H04W 4/80 |

FOREIGN PATENT DOCUMENTS

| | | |
|---|---|---|
| CN | 105392103 A | 3/2016 |
| CN | 108141896 A | 6/2018 |
| JP | 2017-085518 A | 5/2017 |
| JP | 2018-56778 A | 4/2018 |

\* cited by examiner

*Primary Examiner* — Kent Yip
(74) *Attorney, Agent, or Firm* — Canon U.S.A., Inc. IP Division

(57) ABSTRACT

A terminal capable of performing wireless communication stores wireless connection information about connection established by a handover, and, in a case where an instruction to transmit new job data is received after wireless connection is disconnected after job data is transmitted, the wireless connection is automatically established using the stored wireless connection information as far as a predetermined condition is satisfied, to enable smooth job execution.

12 Claims, 8 Drawing Sheets

PRINT EXECUTION SCREEN

FILE SELECTION SCREEN

FIG.7B

WARNING MESSAGE SCREEN

DEVICE SEARCH SCREEN

COMMUNICATION APPARATUS, METHOD OF CONTROLLING COMMUNICATION APPARATUS, AND STORAGE MEDIUM FOR WIRELESS COMMUNICATION

BACKGROUND

Field of the Disclosure

The present disclosure relates to a method of performing wireless communication connection with an image forming apparatus using a terminal.

Description of the Related Art

A mobile terminal, such as a smartphone or tablet personal computer (PC), includes a wireless communication function. The wireless communication function is used to, for example, transmit image data stored in the mobile terminal to an image forming apparatus so that the image forming apparatus prints the image data.

In relation to the wireless connection, a technique called "handover" is known in which wireless connection information about an information processing apparatus is acquired using near-field wireless communication such as Bluetooth® Low Energy or Near-Field Communication (NFC), and wireless communication connection is established. For example, the technique is used as follows. Specifically, a user performs wireless communication connection with an image processing apparatus through a handover using a mobile terminal and thereafter transmits a job, such as a print, copy, or scan job, from the mobile terminal to the image forming apparatus so that the image forming apparatus executes the job. In the case of connecting to an apparatus to perform a job as described above, it is desirable to disconnect the connection immediately after the job is transmitted for the convenience of a next user.

Japanese Patent Application Laid-Open No. 2018-56778 discusses a method in which, if a state of radio waves becomes poor, wireless communication is disconnected and a disconnection history is stored. Then, when a wireless signal is received again, the wireless communication is effectively re-connected based on the disconnection history.

However, since the technique discussed in Japanese Patent Application Laid-Open No. 2018-56778 is to control disconnections and re-connections according to the state of radio waves, the technique is not applicable to a configuration in which connection is automatically disconnected immediately after a job is transmitted as described above (e.g., a case in which a disconnection is performed independently of the reception).

SUMMARY

Various embodiments of the present disclosure implement a technique for smooth re-connection of wireless communication even in a case of a configuration in which wireless connection is automatically disconnected immediately after a job is transmitted.

According to an aspect of some embodiments, a terminal includes a wireless communicator and at least one processor that performs acquiring wireless connection information for performing wireless connection from an information processing apparatus, performing first wireless connection with the information processing apparatus via the wireless communicator based on the acquired wireless connection information, storing the acquired wireless connection information, transmitting first job data to the information processing apparatus via the wireless communicator, automatically disconnecting the first wireless connection performed via the wireless communicator according to transmission of the first job data via the wireless communicator, determining whether a predetermined condition is satisfied in a case where an instruction to transmit second job data is received after the wireless connection via the wireless communicator is disconnected, and automatically performing second wireless connection via the wireless communicator using the stored wireless connection information in a case where it is determined that the predetermined condition is satisfied.

Further features of various embodiments will become apparent from the following description of exemplary embodiments with reference to the attached drawings.

DESCRIPTION OF THE EMBODIMENTS

An exemplary embodiment will be described below with reference to the drawings. It should be noted, however, that the below-described exemplary embodiment is not intended to limit the scope of all embodiments and that not every combination of features described in the exemplary embodiment is essential to a technical solution in every embodiment.

<System Configuration According to Exemplary Embodiment>

Figure 1:
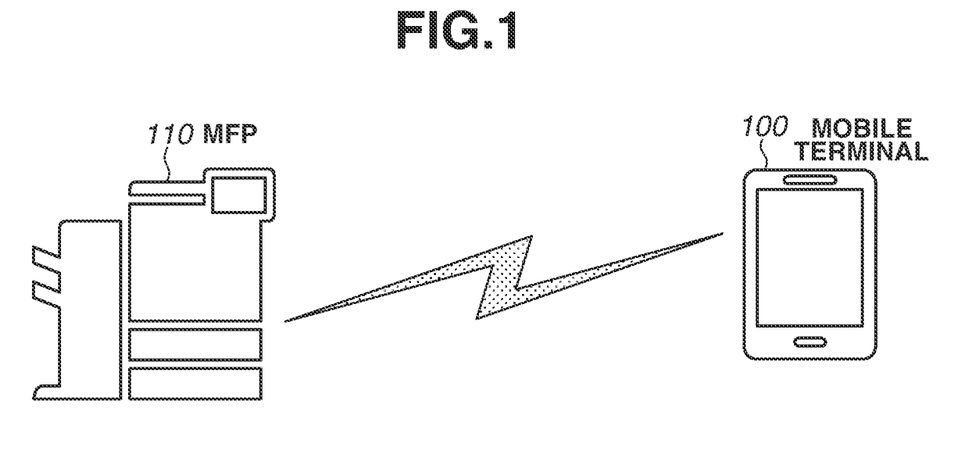
FIG. 1 illustrates a configuration of a communication system.

A configuration of a communication system according to an exemplary embodiment will be described below with reference to FIG. 1. The communication system according to the present exemplary embodiment includes a mobile terminal 100 and a multi-function peripheral (MFP) 110.

The MFP 110 is a multi-function peripheral (image forming apparatus) including a print function, a scan function, and a copy function. The MFP 110 itself functions as a Wireless Fidelity (Wi-Fi) wireless access point and is capable of performing wireless communication connection directly to the mobile terminal 100, and accordingly the MFP 110 is capable of wirelessly and directly connecting to the mobile terminal 100. Further, the MFP 110 is capable of performing Bluetooth® communication. The MFP 110 can receive an instruction to start/end wireless direct connection from the mobile terminal 100 via Bluetooth® communication and can start/end wireless direct connection according to the received instruction.

The mobile terminal 100 is capable of executing wireless communication, such as Wi-Fi or Bluetooth® communication. The mobile terminal 100 receives Wi-Fi access point information (e.g., service set identifier (SSID) and Passkey)

about the MFP 110 from the MFP 110 via Bluetooth® communication. The mobile terminal 100 can start Wi-Fi Direct® connection with the MFP 110 using the access point information and communicates with the MFP 110. Further, the mobile terminal 100 can transmit a job, such as a print, copy, or scan job, to the MFP 110 via wireless direct connection. The MFP 110 having received the job executes the job.

Figure 2:
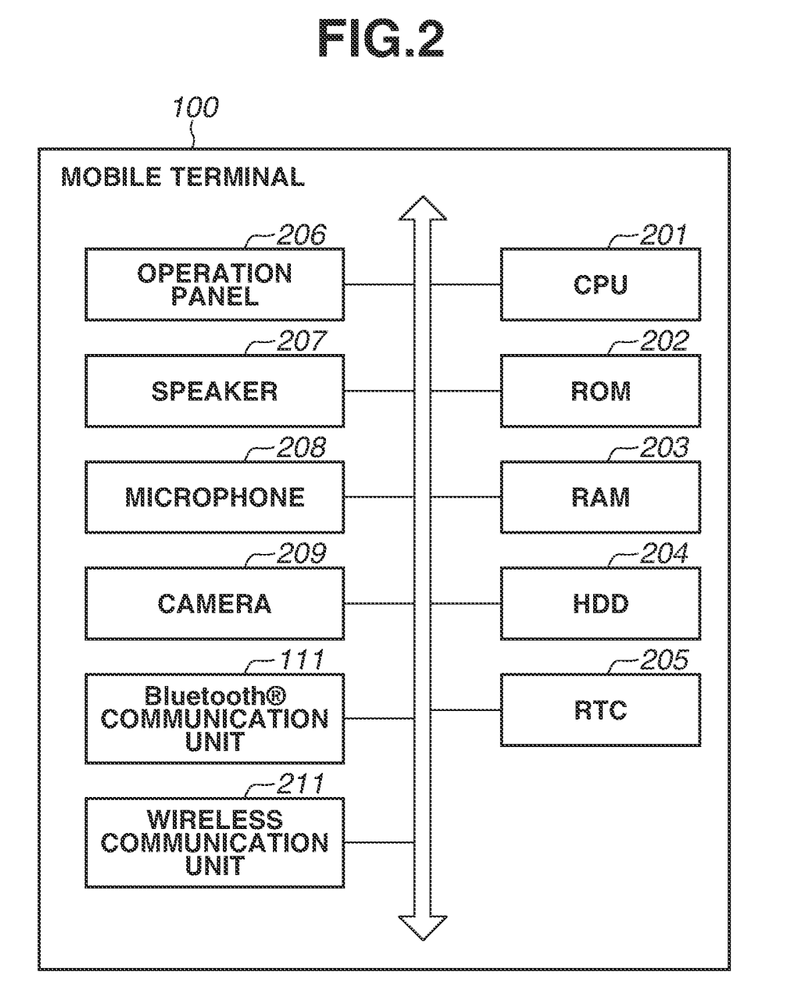
FIG. 2 illustrates a hardware configuration of a mobile terminal.

A hardware configuration of the mobile terminal 100 will be described below with reference to FIG. 2. The mobile terminal 100 according to the present exemplary embodiment is expected to be an apparatus such as a smartphone or tablet personal computer (PC), but can be any other information processing apparatus capable of executing near-field wireless communication.

A central processing unit (CPU) 201 reads a control program (an operating system (OS) or an application) stored in a read-only memory (ROM) (storage memory) 202 and executes various processes for controlling operations of the mobile terminal 100. A random access memory (RAM) 203 is used as a temporary storage area, such as a main memory of the CPU 201 and a work area. A hard disk drive (HDD) 204 stores various data, such as pictures and electronic documents. Alternatively, the control program (an OS 350 or an MFP application 300) can be stored in the HDD 204. A real time clock (RTC) 205 measures the time.

While one CPU 201 executes a process illustrated in a flowchart described below in the case of the mobile terminal 100 according to the present exemplary embodiment, various other configurations can be employed. For example, a plurality of CPUs can cooperate to execute the process illustrated in the flowchart described below.

An operation panel 206 (which is an example of a display unit) includes a touch panel function by which a user touch operation is detectable, and the operation panel 206 displays various screens provided by the OS 350 or the MFP application 300. A user can input a desired operation instruction to the mobile terminal 100 by touching the operation panel 206.

A speaker 207 and a microphone 208 are used when the user calls another mobile terminal or a land-line phone. A camera 209 captures an image in response to an image capturing instruction from the user. The image captured by the camera 209 is stored in a predetermined area of the ROM 202 or the HDD 204. The camera 209 can read a two-dimensional code. The mobile terminal 100 analyzes the read two-dimensional code and acquires information.

A Bluetooth® communication unit 111 is an interface configured to perform Bluetooth® communication. The Bluetooth® communication unit 111 communicates with another device that includes a Bluetooth® interface (I/F). In the present exemplary embodiment, the Bluetooth® communication unit 111 communicates with the MFP 110 using the Bluetooth® standards. A wireless communication unit 211 performs wireless communication using a wireless communication local area network (LAN) (such as Wi-Fi).

Figure 3:
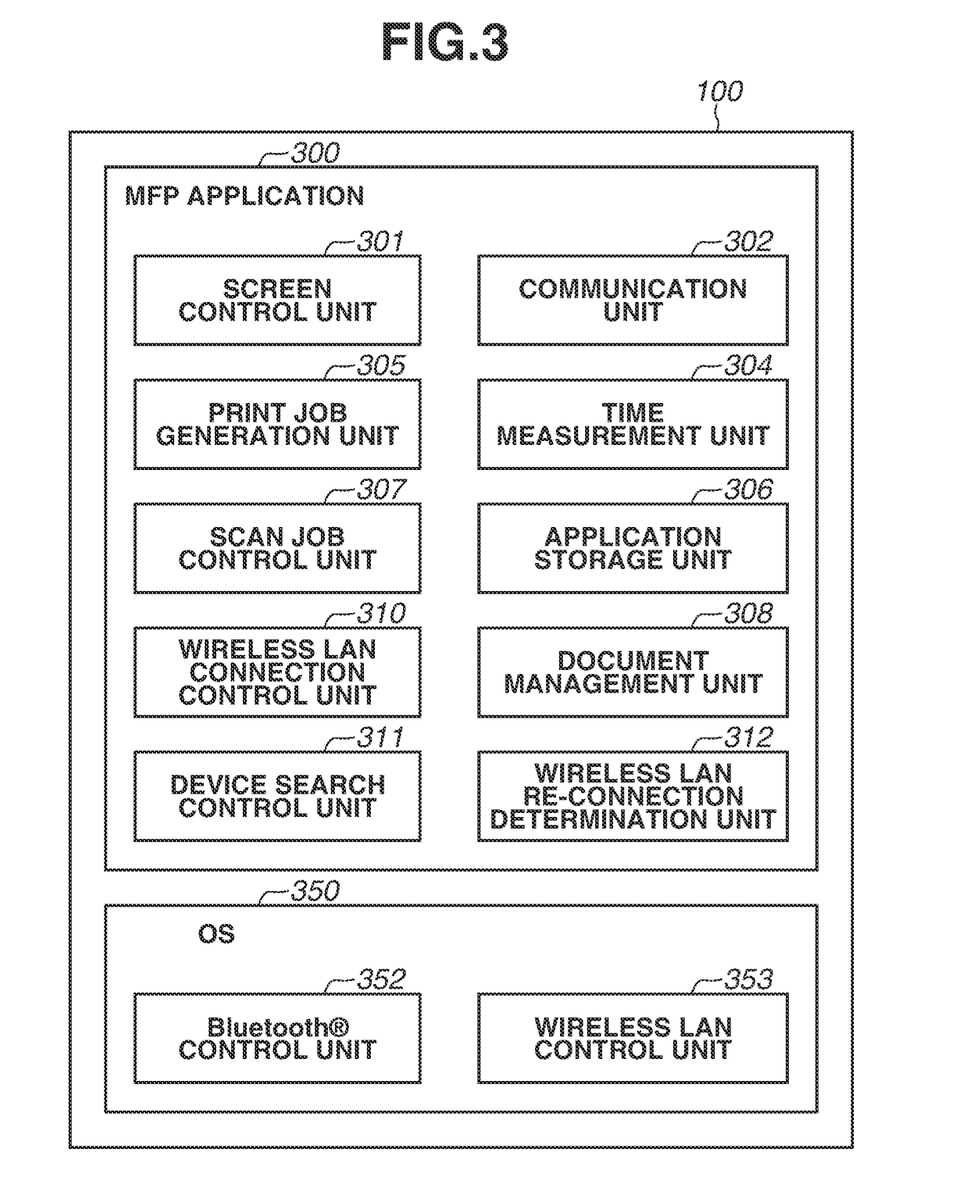
FIG. 3 illustrates a software configuration of the mobile terminal.

A software configuration of the mobile terminal 100 will be described below with reference to FIG. 3. FIG. 3 is a functional block diagram realized by the CPU 201 by reading and executing the control program stored in the ROM 202 or the HDD 204. Specifically, the CPU 201 (computer) executes the program to thereby function as each processing unit illustrated in FIG. 3.

The OS 350 is software for controlling the entire operation of the mobile terminal 100. Various applications, including the MFP application 300 described below, can be installed in the mobile terminal 100. The MFP application 300 is an application for controlling a MFP from a mobile terminal and is installed in the mobile terminal 100 via a network or computer-readable storage medium. The OS 350 exchanges information with the installed applications and changes a screen displayed on the operation panel 206 according to an instruction received from the installed applications. Further, the OS 350 includes device drivers for controlling various types of hardware and provides the applications running on the OS 350 with an application programming interface (API) for using the hardware. The device drivers in the present exemplary embodiment include a Bluetooth® control unit 352 and a wireless LAN control unit 353. The Bluetooth® control unit 352 is a device driver for controlling the Bluetooth® communication unit 111, and the wireless LAN control unit 353 is a device driver for controlling the wireless communication unit 211.

The MFP application 300 is an application installed in the mobile terminal 100. The mobile terminal 100 can perform various setting operations in relation to the print and scan functions on the MFP 110 and issue instructions in relation to the print and scan functions to the MFP 110 using the MFP application 300. Various other applications are also installed in the mobile terminal 100 besides the MFP application 300, but description thereof is omitted.

The software configuration of the MFP application 300 will be described below in more detail. A screen control unit 301 controls a screen displayed on the operation panel 206 via the OS 350. The screen control unit 301 displays an operation screen of the MFP application 300 on the operation panel 206. Further, the screen control unit 301 discriminates an operation instruction input by the user via the operation panel 206. A communication unit 302 transmits and receives commands by controlling near-field wireless communication performed by the Bluetooth® communication unit 111 or wireless communication performed by the wireless communication unit 211 via the OS 350.

A print job generation unit 305 generates a print job in a case where an instruction to print a user-desired image, document, or file is issued. The print job generated by the print job generation unit 305 is transmitted to the MFP 110 by the wireless communication unit 211, and then the MFP 110 executes printing.

A wireless LAN connection control unit 310 controls the wireless LAN connection. The wireless LAN connection control unit 310 instructs the OS 350 to establish a wireless LAN connection (Wi-Fi connection) via the wireless LAN control unit 353 using access point information acquired by near-field wireless communication performed by the Bluetooth® communication unit 111.

A time measurement unit 304 measures the time. An application storage unit 306 temporarily stores various types of information.

A scan job control unit 307 issues a scan instruction to the MFP 110 using the wireless communication unit 211 and displays scan data received from the MFP 110. In a case of storing the scan data, the scan data is stored in the application storage unit 306. The stored scan data is managed by a document management unit 308. A device search control unit 311 displays a device search screen (e.g., as illustrated in FIG. 7B) and performs a device search. A wireless LAN re-connection determination unit 312 re-connects wireless communication, for example as described in FIG. 6.

Figure 4:
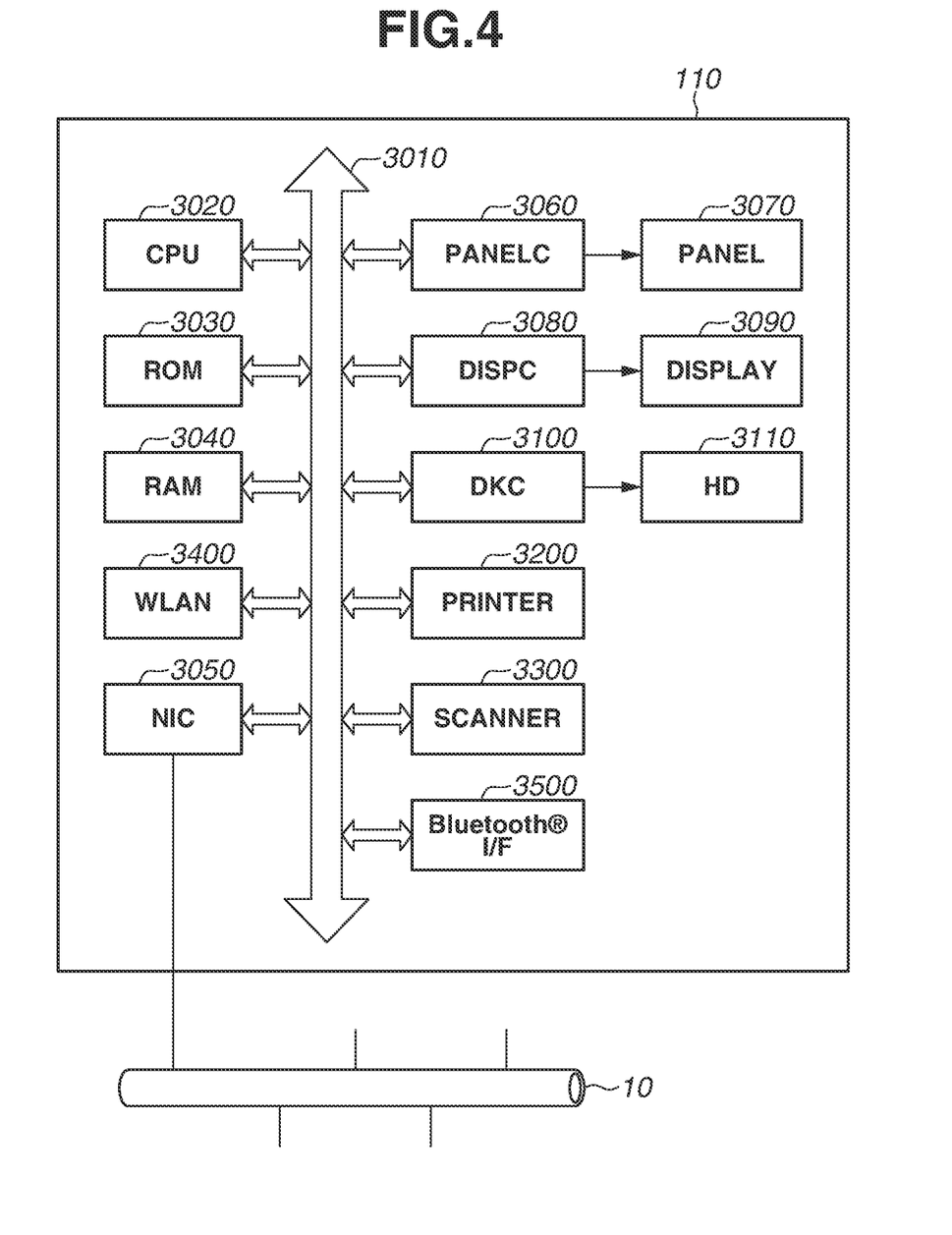
FIG. 4 illustrates a hardware configuration of a multi-function peripheral (MFP).

FIG. 4 illustrates an example of an internal configuration of the MFP 110, and a controller of the MFP 110 according to the present exemplary embodiment has a similar configuration.

A CPU 3020 of the MFP 110 executes software stored in a ROM 3030 or a large-scale storage apparatus 3110, such as a hard disk (HD), and comprehensively controls each device connected to a system bus 3010.

A RAM 3040 functions as a main memory of the CPU 3020 and a work area. An external input controller (PANELC) 3060 controls instructions input from various buttons or a touch panel (PANEL) 3070 of the MFP 110. A display controller (DISPC) 3080 controls a display on a display module (DISPLAY) 3090, such as a liquid crystal display, which is an example of a display unit. A disk controller (DKC) 3100 controls the large-scale storage apparatus 3110. In some cases, the large-scale storage apparatus 3110 is used as a temporary image storage location.

A network interface card (NIC) 3050 bidirectionally exchanges data with another network device or a file server via a network 10. A wireless communication module (WLAN) 3400 connects to an access point or operates in an access point mode so that the MFP 110 operates as an access point and can directly connect to the mobile terminal 100 via wireless communication. A printer 3200 is an electrophotographic print unit configured to perform printing on sheets. The print method does not need to be an electrophotographic method (e.g., the print method may be an inkjet method).

A scanner 3300 is an image reading unit configured to read an image printed on a sheet. In many cases, the scanner 3300 is equipped with an optional auto document feeder (ADF) (not illustrated) and can automatically read a plurality of documents.

A Bluetooth® I/F 3500 is an interface configured to perform near-field wireless communication with another device using the Bluetooth® standards. In the present exemplary embodiment, the Bluetooth® I/F 3500 performs communication with the mobile terminal 100 using the Bluetooth® standards.

Figure 5:
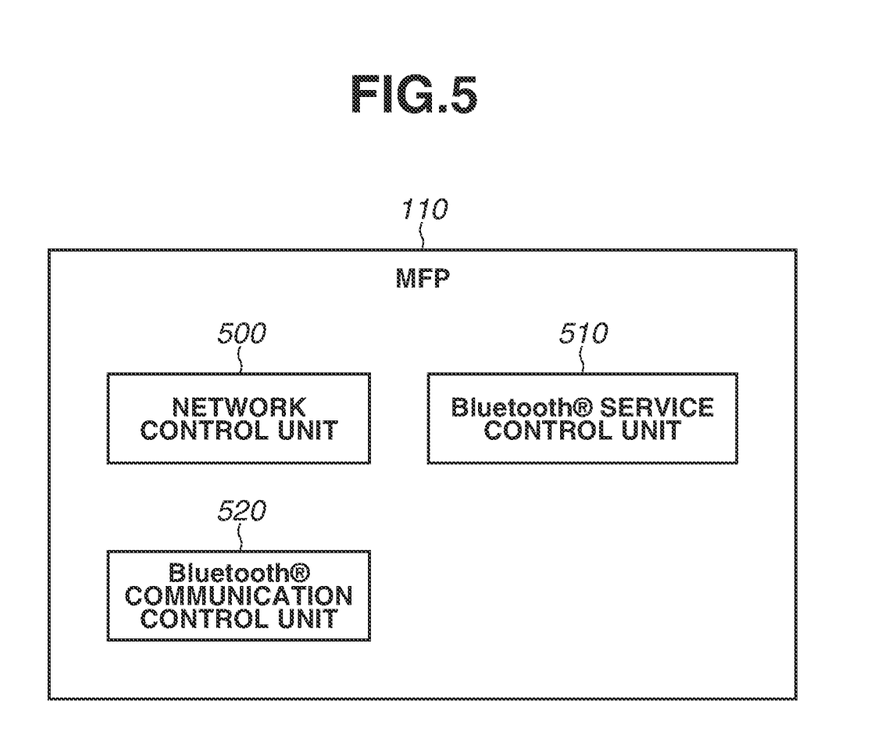
FIG. 5 illustrates a software configuration of the MFP.

FIG. 5 is a block diagram illustrating a software configuration of the MFP 110. The CPU 3020 executes software stored in the ROM 3030 to thereby function as each control unit illustrated in FIG. 5.

A Bluetooth® communication control unit 520 is a device driver configured to control a Bluetooth® I/F 3500 and controls data communication with the mobile terminal 100. Data received via the Bluetooth® communication control unit 520 is transmitted to a Bluetooth® service control unit 510 and processed.

In a case where the Bluetooth® service control unit 510 determines that the data received via the Bluetooth® communication control unit 520 is access point activation instruction information, the Bluetooth® service control unit 510 issues an activation instruction to a network control unit 500. The network control unit 500 having received the instruction activates the Wi-Fi access point.

The network control unit 500 is a module configured to control a network interface card 3050. The software configuration further includes a printer module (not illustrated) configured to control the printer 3200 and a scanner module (not illustrated) configured to control the scanner 3300.

A process that is executed by the MFP application 300 will be described below. While a print job for causing print processing to be executed will be described as an example of a job that the mobile terminal 100 instructs the MFP 110 to execute, the job is not limited to the print job.

Figure 6:
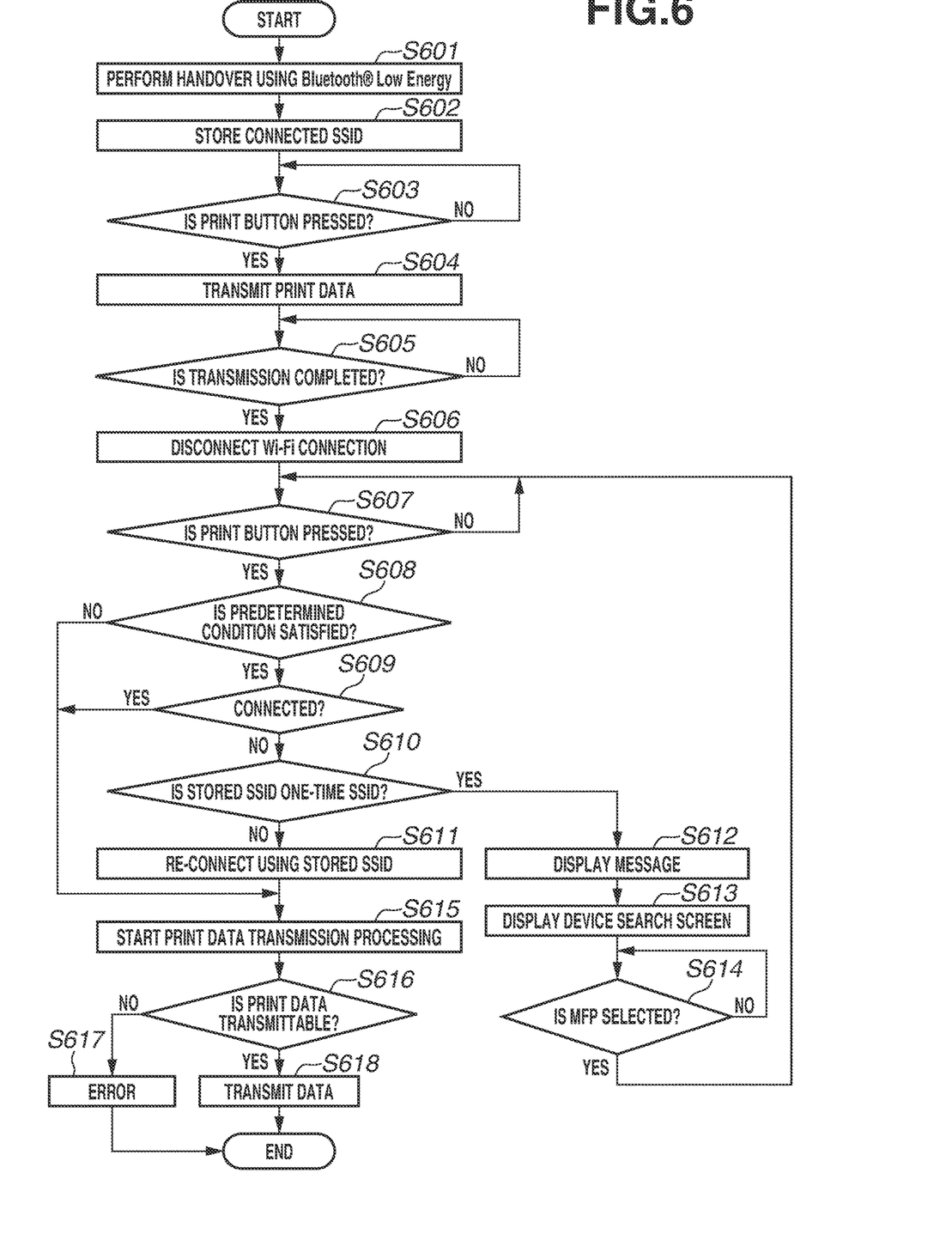
FIG. 6 is a flowchart illustrating a process that is executed by a mobile terminal according to an exemplary embodiment.

FIG. 6 is a flowchart illustrating a process in which the mobile terminal 100 wirelessly connects with the MFP 110 by conducting a handover to Wi-Fi based on information received via Bluetooth® communication, performs print processing, disconnecting the Wi-Fi connection immediately after the print processing, and thereafter performs, if a print instruction is issued, re-connection processing and printing again. The CPU 201 develops the control program stored in the memory, such as the ROM 202, onto the RAM 203 and executes the developed control program to thereby process each operation illustrated in the flowchart in FIG. 6.

In S601, the CPU 201 acquires, on a screen (not illustrated), access point information (wireless connection information) about Wi-Fi from the MFP 110 via Bluetooth® communication and performs Wi-Fi wireless direct connection (i.e., handover from Bluetooth® to Wi-Fi).

In S602, the CPU 201 stores, in the RAM 203, the access point information (e.g., SSID and a password) used in S601. As to the SSID, the type (i.e., a connection mode of the access point) of the SSID is also stored. The type of the SSID of the access point to be activated by the MFP 110 is one of fixed SSID, one-time SSID, and individual-basis SSID. In the present exemplary embodiment, an operation of the access point varies depending on the SSID of the type that is preset to the MFP 110 by an administrator. In the case of the fixed SSID mode, the access point is activated in a case where the connection is disconnected, whereas in the cases of the one-time SSID mode and the individual-basis SSID mode, the function of the access point stops in a case where the connection is disconnected. The one-time SSID mode is a mode in which a different SSID and a different password are used every time, whereas the individual-basis SSID mode is a mode in which a different SSID and a different password are used for each user.

Figure 7A:
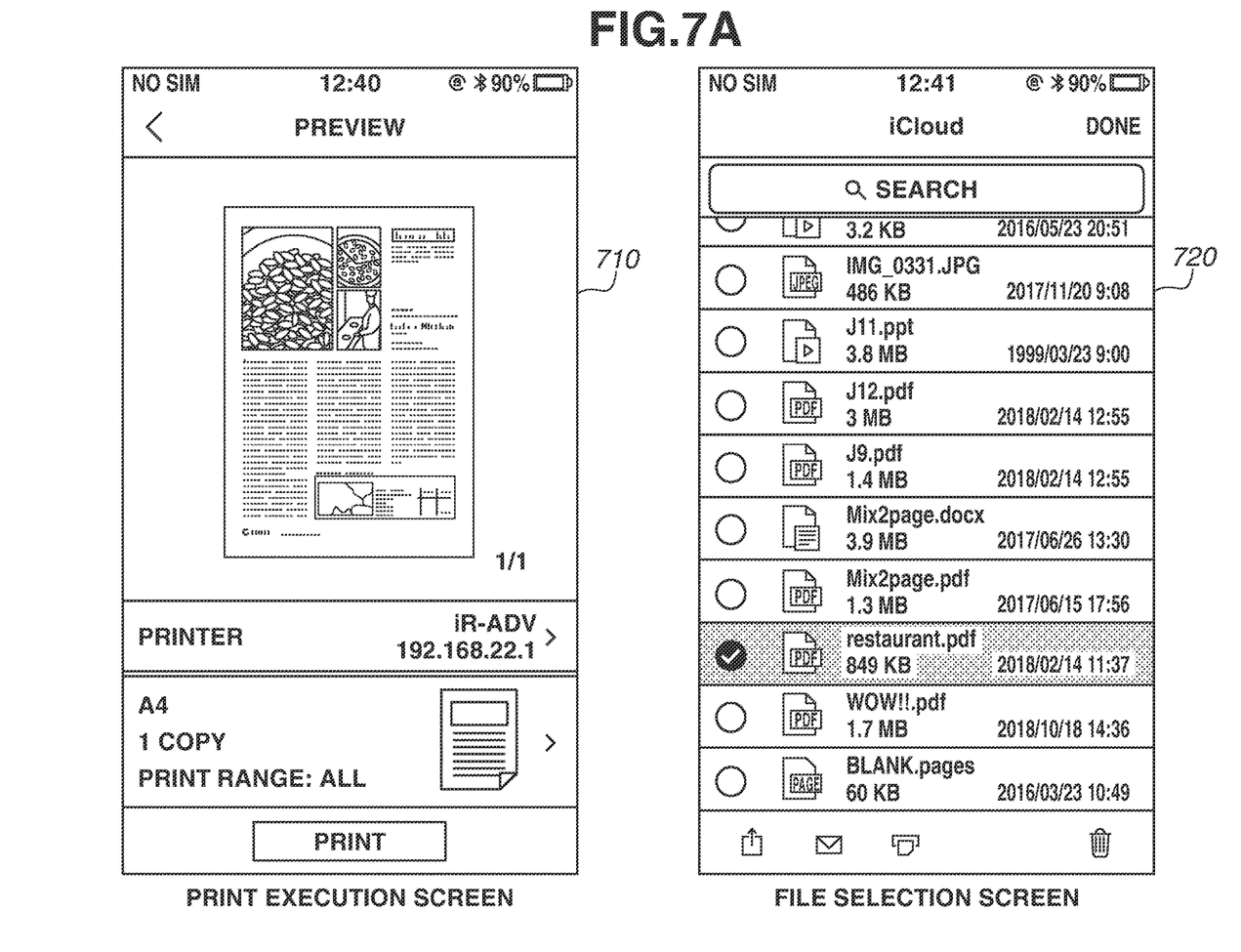
FIGS. 7A and 7B illustrate a user interface (UI) of an application on a mobile terminal according to an exemplary embodiment.
Figure 7B:
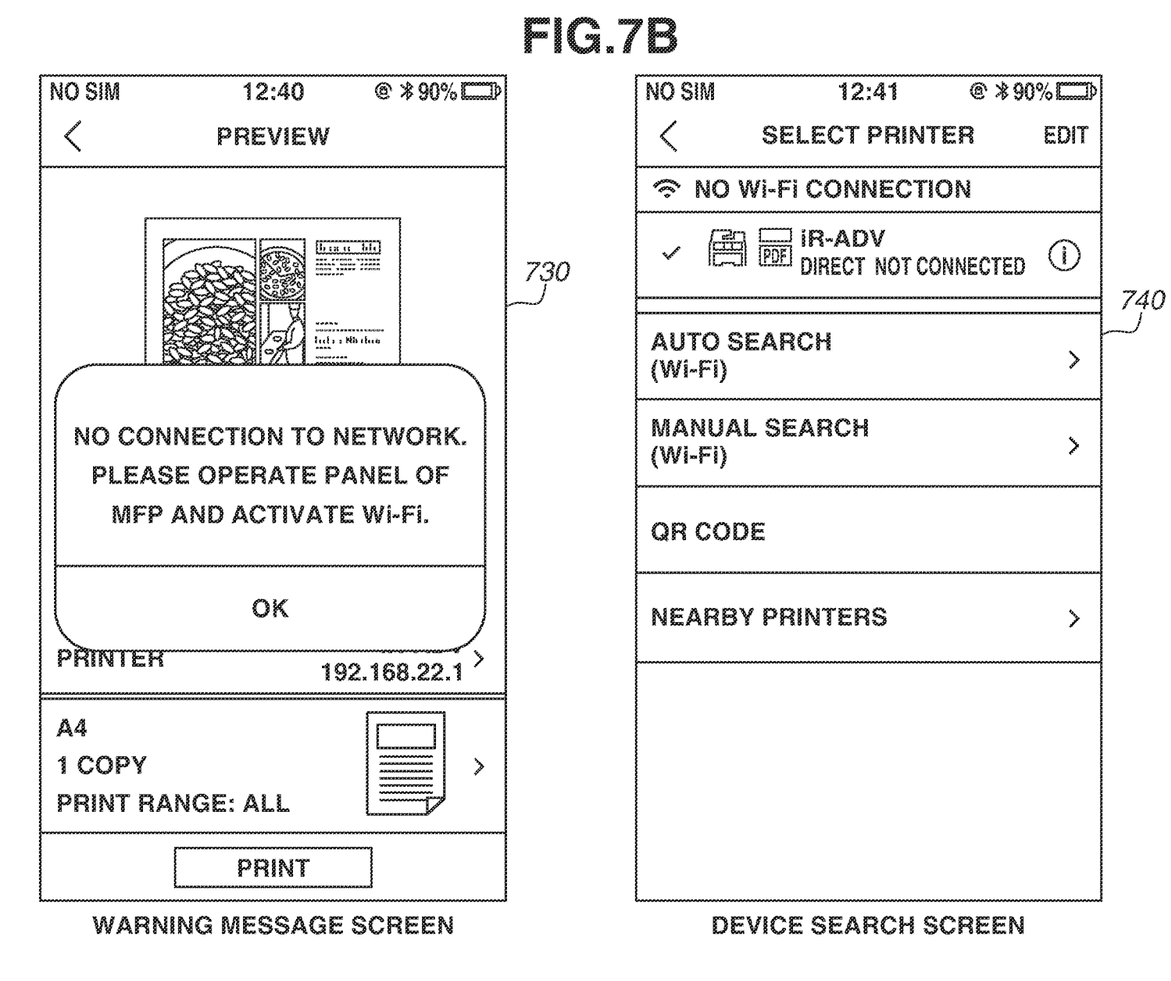

In S603, after a user selects a file to be printed, for example on a file selection screen 720 illustrated in FIG. 7A, the CPU 201 determines whether a print button (e.g., on a print execution screen 710 in FIG. 7A) is pressed by the user. On the print execution screen 710, MFP information about a print data transmission destination is displayed. In a case where the CPU 201 determines that the print button is pressed (i.e., the user inputs a print execution instruction) (YES in S603), the processing proceeds to S604, and the CPU 201 transmits print data (job data of print job).

In S605, the CPU 201 determines whether the transmission of the print data (job data of print job) is completed. In a case where the CPU 201 determines that the transmission is completed (YES in S605), the processing proceeds to S606.

In S606, the CPU 201 automatically disconnects Wi-Fi (wireless LAN), and the screen is changed, for example to the file selection screen 720.

In S607, after the next file to be printed is selected by a user operation on the file selection screen 720, the screen is changed to the print execution screen 710, and the CPU 201 determines whether the print button is pressed (i.e., whether an instruction to transmit the job data of the print job is issued). In a case where the CPU 201 determines that the print button is pressed (YES in S607), the processing proceeds to S608.

In S608, the CPU 201 determines whether a predetermined condition is satisfied. The predetermined condition is, for example, a condition that a wireless connection target MFP is not changed from the time of disconnection (in other words, the wireless connection target MFP at the time of disconnection and the MFP that is the new job data transmission destination are the same), a condition that the application continues to operate in the foreground from the time of the disconnection, and a condition that an operation is performed within a predetermined period from the disconnection. The predetermined condition is not limited to the above-described conditions and can be any other applicable condition. In a case where the condition is satisfied (YES in S608), the processing proceeds to S609. On the other hand, in a case where the condition is not satisfied (NO in S608), the processing proceeds to S615.

In S609, the CPU 201 determines whether Wi-Fi (wireless LAN) connection is already established. Basically, the connection is supposed to be disconnected in S606, but if the disconnection in S606 is unsuccessful, there is a possibility that the connection is still maintained, so that this determination is performed. In the present exemplary embodiment, the determination of whether connection is already established is performed based on the SSID of the currently-connected access point and the IP address assigned to the mobile terminal 100. In a case where connection is already established (YES in S609), the processing proceeds to S615. Otherwise (NO in S609), the processing proceeds to S610.

In S610, the CPU 201 determines whether the SSID of the access point information stored in S602 is a one-time SSID. In a case where the SSID is not a one-time SSID (NO in S610), the processing proceeds to S611. On the other hand, in a case where the SSID is a one-time SSID (YES in S610), the processing proceeds to S612.

In S611, the CPU 201 automatically performs re-connection processing using the access point information (SSID and a password) stored in the RAM 203. At this time, in a case where the SSID of the stored access point information is an individual-basis SSID, an instruction to activate the access point of the MFP 110 is issued via Bluetooth® communication, and connection processing is performed using the stored SSID information. On the other hand, in a case where the SSID of the stored access point information is a fixed SSID, since the SSID remains activated, re-connection processing is directly performed.

In 612, the CPU 201 displays a warning message screen 730 illustrated in FIG. 7B and prompts the user to perform an operation to activate the access point of the MFP 110. For example, the processing in S612 is performed to display a message that prompts the user to operate the MFP 110 to activate the access point and operate an OS screen to connect to the access point. Here, a warning is issued when the access point information is a one-time SSID. However, the exemplary embodiment is not limited to this, and a warning may be issued when the access point is not activated. After the access point is activated, in S613, the CPU 201 displays a device search screen 740 illustrated in FIG. 7B and performs a device search. In S614, the CPU 201 determines whether a desired MFP is selected by the user from the devices (MFPs) detected in the device search. In a case where a MFP is selected (YES in S614), connection with the selected MFP is established, and thereafter the processing proceeds to S607. In S607 in this case, the file selection screen 720 can be displayed with a previously-selected next print target file being in a selected state.

In S615, print data transmission processing starts.

In S616, the CPU 201 determines whether the print data in S615 is transmittable. In a case where the print data is not transmittable (NO in S616), the processing proceeds to S617, and a warning associated with a transmission error is issued. For example, in a case in which the wireless connection is disconnected, a transmission error occurs. On the other hand, in a case where the print data is transmittable (YES in S616), the processing proceeds to S618, and the data is transmitted. For example, the mobile terminal 100 can store wireless connection information about a plurality of apparatuses. In a case where the wireless re-connection target apparatus is an apparatus that is different from the image forming apparatus being the connection target at the time of the Wi-Fi disconnection in S606 and where the mobile terminal 100 stores wireless connection information about the apparatus, the CPU 201 determines that the predetermined condition is not satisfied in 608, and a wireless re-connection is not executable, so that a transmission error occurs.

As described above, in the case in which the user attempts to print consecutively after the connection is automatically disconnected after printing, a re-connection is automatically performed to enable smooth printing. Further, the disconnection and re-connection of the wireless communication are automatically performed in background, so that the user can perform an operation without being conscious of the settings apparently.

While the image forming apparatus (MFP) including a plurality of functions (a print function, a scan function, a copy function and so on) is used as the MFP 110 in the present exemplary embodiment, the MFP 110 is not limited to the image forming apparatus (MFP), and an application is also possible to a single-function apparatus and other information processing apparatuses. Further, while the print job (print processing) is described as an example in FIG. 6, the job type is not limited to the print job. For example, an application is also possible to a fax transmission job of fax transmitting data stored in the mobile terminal 100 via the MFP 110 and a box storage processing job of storing data stored in the mobile terminal 100 in a storage area of the MFP 110. Further, while the mobile terminal 100 acquires Wi-Fi wireless connection information using Bluetooth® and performs a handover in S601 in FIG. 6, the processing is not limited to the above-described processing. The mobile terminal 100 can acquire the wireless connection information using NFC, or the mobile terminal 100 can acquire the wireless connection information by reading a quick response (QR) code displayed on the MFP 110 to perform wireless communication connection.

Other Embodiments

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Applications No. 2018-201271, which was filed on Oct. 25, 2018 and No. 2019-166874, which was filed on Sep. 13, 2019, and which are hereby incorporated by reference herein in their entirety.

What is claimed is:

1. A method that is executed by a terminal including a short range wireless communicator configured to perform short range wireless communication and a LAN communicator configured to perform wireless LAN communication, the method comprising:
  performing first wireless LAN connection with an information processing apparatus via the LAN communicator based on that wireless connection information for performing wireless LAN communication is received from the information processing apparatus via the short range wireless communicator;
  displaying a button for transmitting job data;
  transmitting first job data to the information processing apparatus via the first wireless LAN connection based on that the button is selected in a state in which the first wireless LAN connection is performed;
  disconnecting the first wireless LAN connection performed via the LAN communicator based on completion of processing of the first job data; and
  based on selection of the button in a state in which wireless LAN connection is not performed with the information processing apparatus,
  performing, based on receiving an instruction to transmit second job data in a state in which the first wireless LAN connection is disconnected and based on a fact that another information processing apparatus, which is different from the information processing apparatus, is not set as a transmission destination of the second job data, second wireless LAN connection with the information processing apparatus automatically without performing another short range wireless communication,
  not performing, based on receiving the instruction to transmit the second job data in a state in which the first wireless LAN connection is disconnected and based on a fact that the another information processing apparatus is set as the transmission destination, the second wireless LAN connection automatically, and
  transmitting the second job data via the performed second wireless LAN connection.

2. The method according to claim 1, wherein the short range wireless communicator performs communication using at least one of Bluetooth® and Near-Field Communication (NFC).

3. The method according to claim 1, wherein the wireless connection information includes information about an access point and a type of the access point.

4. The method according to claim 1, wherein the first job data and the second job data is data for instructing the information processing apparatus to execute print processing.

5. The method according to claim 1, wherein the method further comprises:
  displaying, on a display unit, a second screen for selecting a transmission target file included in a job data when the first wireless connection is disconnected.

6. The method according to claim 1, further comprising:
  storing the received wireless connection information;
  wherein, based on the selection of the button in the state in which wireless LAN connection is not performed with the information processing apparatus, the second wireless LAN connection is performed automatically using the stored wireless connection information.

7. The method according to claim 1,
  wherein the completion of processing of the first job data is completion of transmission of the first job data.

8. The method according to claim 1, further comprising:
  determining whether a predetermined condition for performing wireless LAN communication again is satisfied or not;
  wherein, in a case where the predetermined condition is determined to be satisfied, based on the receiving the instruction to transmit the second job data in the state in which the first wireless LAN connection is disconnected, the second wireless LAN connection with the information processing apparatus is performed automatically without performing another short range wireless communication.

9. The method according to claim 8, wherein the predetermined condition is s condition that software running on the terminal and configured to transmit the first job data and the second job data remains in foreground after the first wireless connection is disconnected.

10. The method according to claim 8, wherein the predetermined condition is a condition that an amount of time from the disconnection of the wireless connection is within a predetermined amount of time.

11. A non-transitory computer-readable storage medium storing a program executed by a computer of a terminal which has a short range wireless communicator configured to perform short range wireless communication and a LAN communicator configured to perform wireless LAN communication, wherein the program causes the computer to perform;
  performing first wireless LAN connection with an information processing apparatus via the LAN communicator based on that wireless connection information for performing wireless LAN communication is received from the information processing apparatus via the short range wireless communicator;
  displaying a button for transmitting job data;
  transmitting job data to the information processing apparatus via the first wireless LAN connection based on that the button is selected in a state in which the first wireless LAN connection is performed;
  disconnecting the first wireless LAN connection performed via the LAN communicator based on completion of processing of the first job data; and
  based on selection of the button in a state in which wireless LAN connection is not performed with the information processing apparatus,
  performing, based on receiving an instruction to transmit second job data in a state in which the first wireless LAN connection is disconnected and based on a fact that another information processing apparatus, which is different from the information processing apparatus, is not set as a transmission destination of the second job data, second wireless LAN connection with the information processing apparatus automatically without performing another short range wireless communication, not performing based on receiving the instruction to transmit the second job data in a state in which the first wireless LAN connection is disconnected and based on a fact that the another information processing apparatus is set as the transmission destination, the second wireless LAN connection automatically, and transmitting the second job data via the performed second wireless LAN connection.

12. A device comprising:

a short range wireless communicator configured to perform short range wireless communication;

a LAN communicator configured to perform wireless LAN communication;

at least one memory; and at least one processor, wherein the at least one memory and the at least one processor are configured to cooperate to cause the device to:

perform first wireless LAN connection with an information processing apparatus via the LAN communicator based on that wireless connection information for performing wireless LAN communication is received from the information processing apparatus via the short range wireless communicator;

display a button for transmitting job data on a display device;

transmit first job data to the information processing apparatus via the first wireless LAN connection based on that the button is selected in a state hi which the first wireless LAN connection is performed;

disconnect the first wireless LAN connection performed via the LAN communicator based on completion of processing of the first job data; and based on selection of the button in a state in which wireless LAN connection is not performed with the information processing apparatus, perform, based on receiving an instruction to transmit second job data in a state in which the first wireless LAN connection is disconnected and based on a fact that another information processing apparatus, which is different from the information processing apparatus, is not set as a transmission destination of the second job data, second wireless LAN connection with the information processing apparatus automatically without performing another short range wireless communication, not perform, based on receiving the instruction to transmit the second job data in a state in which the first wireless LAN connection is disconnected and based on a fact that the another information processing apparatus is set as the transmission destination, the second wireless LAN connection automatically, and transmit second job data via the performed second wireless LAN connection.

* * * * *